3,340,098
METHOD OF MAKING OXYGEN ELECTRODES FOR ALKALINE FUEL CELLS

Dexter William Smith, Birmingham, England, assignor to Joseph Lucas (Industries) Limited, Birmingham, England
No Drawing. Filed Nov. 18, 1965, Ser. No. 508,581
5 Claims. (Cl. 136—120)

A conventional silver oxygen electrode for an alkaline fuel cell can be rendered more efficient by the addition thereto of catalysts which increase the number of free electrons available, suitable catalysts being alloys of silver with cadmium, indium, tin or antimony. However, it is difficult to mix such alloys directly with silver and then produce a porous structure because it is difficult to produce the alloys in powder form.

The object of this invention is to provide a convenient method of manufacturing an oxygen electrode which can be used in an alkaline fuel cell but can also be used in a hybrid fuel cell. The hybrid fuel cell can be regarded as a fuel cell in which the fuel electrode is replaced by a battery plate, or as an alkaline battery in which one of the battery plates is replaced by an oxygen electrode.

A method according to the invention comprises grinding an alloy of silver which has catalytic properties with alumina balls in an alumina pot to form a powder consisting of the silver alloy catalyst and alumina, and utilizing the powder to form a porous electrode.

In one example, an alloy chosen from the group silver-cadmium, silver-tin, silver-indium and silver-antimony is ground with alumina balls in an alumina pot. The alloy contains about 95% to 40% silver together with about 5% to 60% of one of the other metals, and grinding is continued until the pot contains powdered alumina with at least 10% by weight of the alloy. The powder is then removed from the pot and if necessary is ground further in a non-oxidising atmosphere to ensure that it will pass through a −350 B.S. mesh.

The next step is to produce finely divided silver of less than ten microns particle size, and this can be done in known manner by using an organic solvent to extract the base from a commercially available silver suspension. The resulting silver is thoroughly mixed with the powder prepared as above or with a mixture of powders prepared as above, in proportions of 95% silver to 5% powder. If desired, a wind sieve can be used as described in application No. 35,250/63 to ensure that particles of the correct size are mixed. After mixing, the silver-powder mixture is pressed at 500–600° C. under pressure of an inert (i.e., non-oxidising) atmosphere to form the electrode. It will be understood that the alumina acts as a skeletal support for the alloy.

The electrode can be used in conjunction with a hydrogen electrode in an alkaline fuel cell, or in conjunction with a battery plate in a hybrid fuel cell, of which the best known example is the zinc-air battery which utilises a zinc battery plate and an oxygen electrode.

Having thus described my invention what I claim as new and desire to secure by Letters Patent is:

1. A method of manufacturing an oxygen electrode, comprising grinding an alloy of silver which has catalytic properties with alumina balls in an alumina pot to form a powder consisting of the silver alloy catalyst and alumina, mixing the powder thus formed with powdered silver, pressing the mixture of powders to form a plate, and then sintering the plate to form an oxygen electrode in which the alumina acts as skeletal support for said catalytic alloy.

2. A method as claimed in claim 1 in which the grinding is carried out in a non-oxidising atmosphere.

3. A method as claimed in claim 1 in which the alloy consists of silver together with an element chosen from the group cadmium, tin, indium and antimony.

4. A method as claimed in claim 1 in which grinding is continued until the pot contains powdered alumina with at least 10% by weight of the alloy.

5. A method as claimed in claim 4 in which prior to mixing the powder formed in the pot with powdered silver, said powder is ground in a non-oxidising atmosphere to ensure that it will pass through a −350 B.S. mesh.

References Cited
UNITED STATES PATENTS 3,126,273   3/1964   Justi et al. _____ 75—0.55

WINSTON A. DOUGLAS, *Primary Examiner.*

N. P. BULLOCH, O. F. CRUTCHFIELD,
*Assistant Examiners.*